US007602078B2

(12) United States Patent
Li

(10) Patent No.: US 7,602,078 B2
(45) Date of Patent: Oct. 13, 2009

(54) COMBINATIONAL POWER CORD FOR MULTIMEDIA USE

(75) Inventor: Tung-Liang Li, Tainan (TW)

(73) Assignee: ST&T Electric Corp., Tainan (TW)

( * ) Notice: Subject to any disclaimer, the term of this patent is extended or adjusted under 35 U.S.C. 154(b) by 283 days.

(21) Appl. No.: 11/829,913

(22) Filed: Jul. 29, 2007

(65) Prior Publication Data

US 2009/0027847 A1 Jan. 29, 2009

(51) Int. Cl.
*H02J 3/02* (2006.01)
*H02J 3/34* (2006.01)

(52) U.S. Cl. .......................................................... 307/3

(58) Field of Classification Search ..................... 307/3, 307/29, 36, 54, 77; 340/286.01, 310.18
See application file for complete search history.

(56) References Cited

U.S. PATENT DOCUMENTS 6,956,464 B2 * 10/2005 Wang et al. ................. 375/258
2003/0129869 A1 * 7/2003 Milan ......................... 439/214

* cited by examiner

*Primary Examiner*—Stephen W Jackson
*Assistant Examiner*—Carlos Amaya
(74) *Attorney, Agent, or Firm*—Chun-Ming Shih

(57) ABSTRACT

A combinational power cord for multimedia use includes one or more multimedia power devices mutually connected to provide power and to enable data transmission among different multimedia devices. The combinational power cord is extensible by connecting a plurality of multimedia power devices to provide power and signal connection at the same time without any circuit redesign, thereby fulfilling the data transmission requirements and connectivity of different multimedia devices.

17 Claims, 7 Drawing Sheets

COMBINATIONAL POWER CORD FOR MULTIMEDIA USE

BACKGROUND OF THE INVENTION

1. Field of the Invention

A combinational power cord for multimedia use comprises at least one multimedia power device mutually connected to provide power and to enable data transmission among different multimedia devices. The combinational power cord is extensible to fulfill the data transmission requirements and connectivity of different multimedia devices.

2. Description of the Prior Art

As PC becomes popular, the development of multimedia contents accelerates. It is now common for a family to own more than two computers and other multimedia devices. These electrical appliances or electronics devices provide entertainment and convenience and bring computer technologies to our daily lives. The development of networking computers further provides more convenience and efficiency. Although it is quite straightforward in concept to connect various multimedia devices to network. It is often that many computers have built-in networking capabilities to help users to connect to Internet. However, it is complicate and difficult to establish network connections. In other words, a user has to route the wire/cable between furniture to connect the computer, making it not acceptable in terms of aesthetic viewpoint and easy to trap people. The user can choose to have professional builders to route the network cable, while this should need more efforts and cost. It is likely that users want to connect their devices to computers and let the devices control by computers, for example, to set the time for playing music through speakers or to turn on TV. To achieve these functions, users have to connect these multimedia devices to computers. Then again they might encounter the wiring problems as well. Although wireless techniques such as Infrared or RF have been proposed and used, there are certain deficiencies such as the transmitting range and angle, the EM interference between devices. Besides, there are other factors such as shielding effect and possible harmfulness to human bodies to consider.

Therefore, power line transmission has been proposed to convert digital signals and use power line carrier signals to send modulated signals since the power supply plays an important role in providing power to electrical appliances or electronics devices. Power outlets can be seen everywhere in every family or office to help to reduce the wirings or the need to add phone line and wired network sockets, therefore it is much easier to build a multimedia network.

Traditional power cords such as the ones disclosed in ROC patents No. 089112369 and No. 092208790 have fixed number of sockets and support a fixed multimedia format. They use sockets to interact with multimedia devices to provide multimedia signals and power to these electrical appliances and electronics devices. In actual use these power cords are not flexible in providing the number of sockets and the supported media types. In ROC patent No. 91212382, it discloses a power cord supporting one single multimedia device; the present invention is a modification of ROC patent No. 91212382 to provide a power cord, which can support multiple multimedia devices without the need to redesign.

SUMMARY OF THE INVENTION

The present invention is to provide a combinational power cord which can connect to multimedia devices and provide power and signals connection to reduce the need for additional wires and the possibility of trapping people and to enhance the esthetic feel in the house.

The present invention is to provide a combinational power cord which can connect to different multimedia devices and provide both power and signals connections. The present invention uses one single kind of multimedia device module to fulfill the needs of different multimedia requirements.

In order to solve the deficiencies and inconvenience of the prior art techniques, the present invention proposes a means, which combines network routing or exchange capabilities with power cords supporting power line transmission specifications.

The present invention discloses a combinational power cord for multimedia use, comprising at least one multimedia power device, which is characterized in: a power line module coupling with an end of a power line to electrically connect to an AC power distribution line and to convert an AC power of said AC power distribution line into suitable driving power for modules depicted below; a case, said case having a plurality of power sockets and a plurality of multimedia ports disposed thereon for the AC power from said AC power distribution line to be distributed to said plurality of power sockets; at least one terminal connected to said power line module; at least one socket disposed on the outside of said case for connecting with a corresponding socket of another multimedia power device; at least one multimedia port disposed on the outside of said case for different multimedia devices to couple with said multimedia power device via different multimedia ports; a multimedia network module which is built-in inside said case for connecting with said plurality of multimedia ports; and a power line communication module which is built-in inside said case for communicating with said power line module and said multimedia network module, said power line communication module using the data communication protocol of said AC power distribution line to convert and modulate multimedia packets sent from said multimedia network module and then sending them over said AC power distribution line, in the mean time, said power line communication module using the data communication protocol of said AC power distribution line to convert and demodulate a data transmitted by said AC power distribution into packets suitable for said multimedia network module and then sending packets to said multimedia network module for processing.

Besides, the present invention discloses a combinational power cord for multimedia use, which also combines network routing or switching capabilities and supports Ethernet network standard.

The present invention discloses a combinational power cord for multimedia use, comprising at least one multimedia power device, which is characterized in: a power line module coupling with an end of a power line to electrically connect to an AC power distribution line and to convert an AC power of said AC power distribution line into suitable driving power for modules depicted below; a case, said case having a plurality of power sockets and a plurality of multimedia ports disposed thereon for the AC power from said AC power distribution line to be distributed to said plurality of power sockets; at least one terminal connected to said power line module and an Ethernet module; at least one socket disposed on the outside of said case for connecting with a corresponding socket of another multimedia power device; at least one multimedia port disposed on the outside of said case for different multimedia devices to couple with said multimedia power device via different multimedia ports; a multimedia network module which is built-in inside said case for connecting with said plurality of multimedia ports; and said Ethernet module which is built-in inside said case for communicating with said multimedia network module, said Ethernet module using the Ethernet communication protocol to convert and modulate multimedia packets sent from said multimedia network module and then sending them over an Ethernet network, in the mean time, said Ethernet module using the Ethernet protocol to convert and demodulate a data transmitted by said Ethernet network into packets suitable for said multimedia network module and then sending packets to said multimedia network module for processing.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

The disclosed embodiments in accompany with illustrated drawings is to further understand the objects, structural features and effects of the present invention as follows.

First Embodiments

Figure 1:
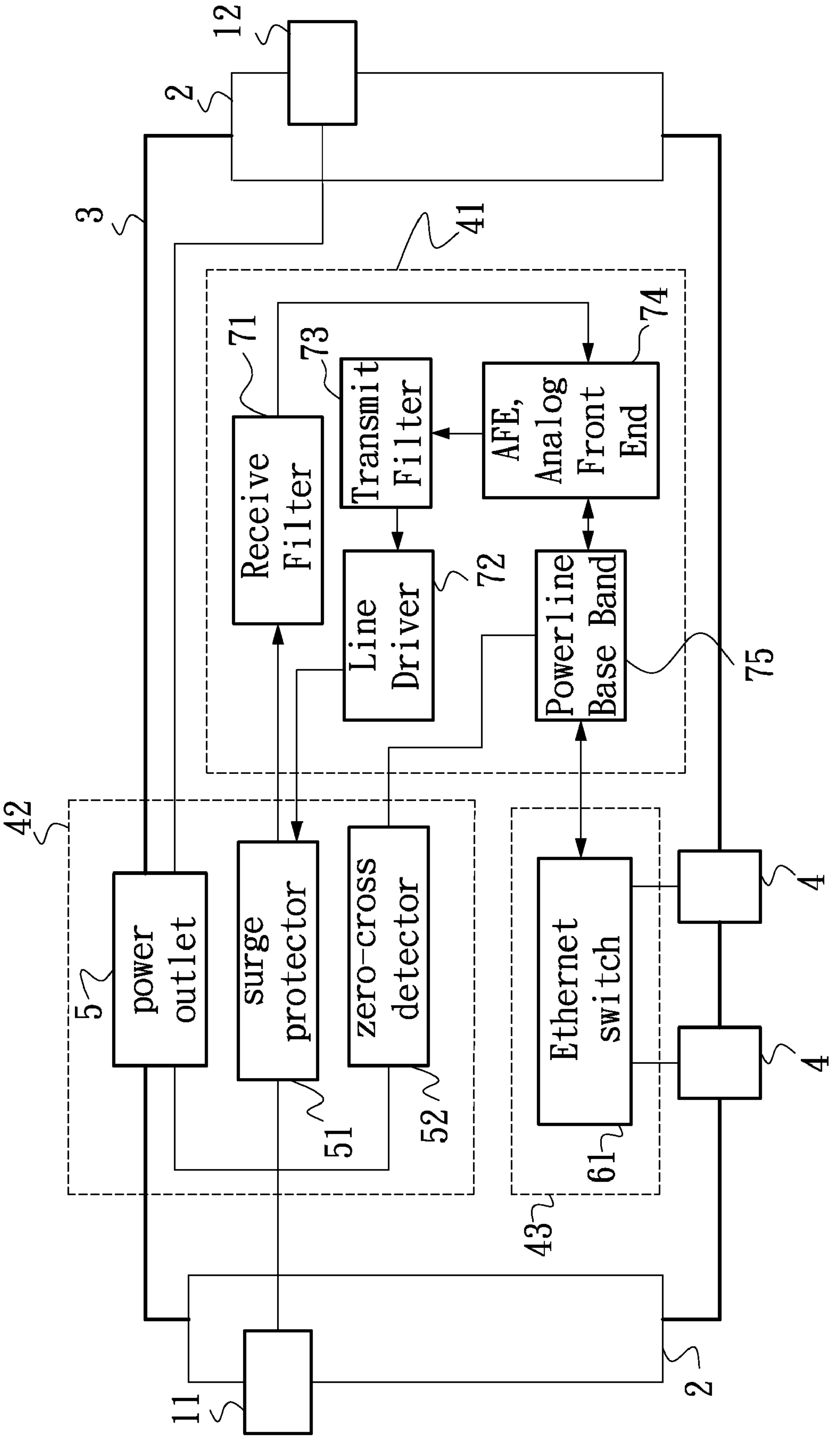
FIG. 1 illustrates an embodiment view of a combinational power cord for multimedia use.

Please refer to FIG. 1, which illustrates an embodiment view of a combinational power cord for multimedia use, the combinational power cord for multimedia use comprises at least one multimedia power device, wherein the multimedia power device comprises a power line module (42), a case (3), at least one terminals (11, 12), at least one socket (2), at least one multimedia port (4), a multimedia network module (43) and a power line communication module (41). The present invention is characterized in that various multimedia power devices can be mutually connected in series through the socket (2) to become a combinational power cord. Each multimedia power device comprises at least one socket (2) and a few terminals (11, 12) connected to the power line module (42). The socket (2) uses connection means to connect with a corresponding socket (2) and terminals (11, 12) of another multimedia power device, which in turn connects to the power line module (42). The power line module (42) comprises a surge protector (Surge Protection/powerline coupler) (51) to protect the multimedia power device when the voltage rises to abnormal level. Besides, the power line module (42) comprises a zero-cross detector (52) for synchronizing the powerline carrier signal.

The case (3) is implemented with a plurality of power outlets (5) and a plurality of multimedia ports (4). The multimedia ports (4) in this embodiment are Ethernet RJ-45 connection ports. The power outlet (5) provides power connection to networking devices such as computer or printer, and electrical appliances such as fans or light, in other words, it can act as a traditional power cord. The RJ-45 port can provide network connection to computer or printer for network data transmission. The power line module (42) has one end connected to the case (3) and the other end connected to the plug. The plug can be inserted directly into a common power outlet to connect to AC power source and to provide network data transmission. Network data is transmitted to multimedia network module (43) via RJ-45 port. The multimedia network module (43) comprises an Ethernet switch. The Ethernet switch (61) encodes the network data into multimedia packets and transmit them to the power line communication module (41). The power line communication module (41) is built-in inside the case (3) and connects to the power line module (42) and the multimedia network module (43). The powerline communication module (41) receives the multimedia packets from the multimedia network module (43) and uses the powerline baseband (75) to modulate the multimedia packets and the analog front end (AFE) (74) to convert the digital signals into analog signals. Then the transmit filter (73) filters out the noise in the analog signals. Finally, the line driver (72) loads the analog signals into the power line module (42) for transmission.

The analog signals carried by the AC signals of the power distribution line are received by another multimedia power device on the other end. The power line module (42) transmits the analog signals to the receive filter (71) of the power line communication module (41). Then the receive filter (71) filters out the noise in the analog signals. The analog front end (AFE) (74) and the powerline baseband (75) of the power line communication module (41) convert the filtered analog signals into digital signals to be sent to the Ethernet switch (61) of the multimedia network module (43), which decodes the digital signals (network data) and transmits them to a computer or a printer.

The multimedia network module (43) can be different modules for decoding/encoding different multimedia signals such as HDTV signal, analog/digital video signal, and audio signal.

Figure 2:
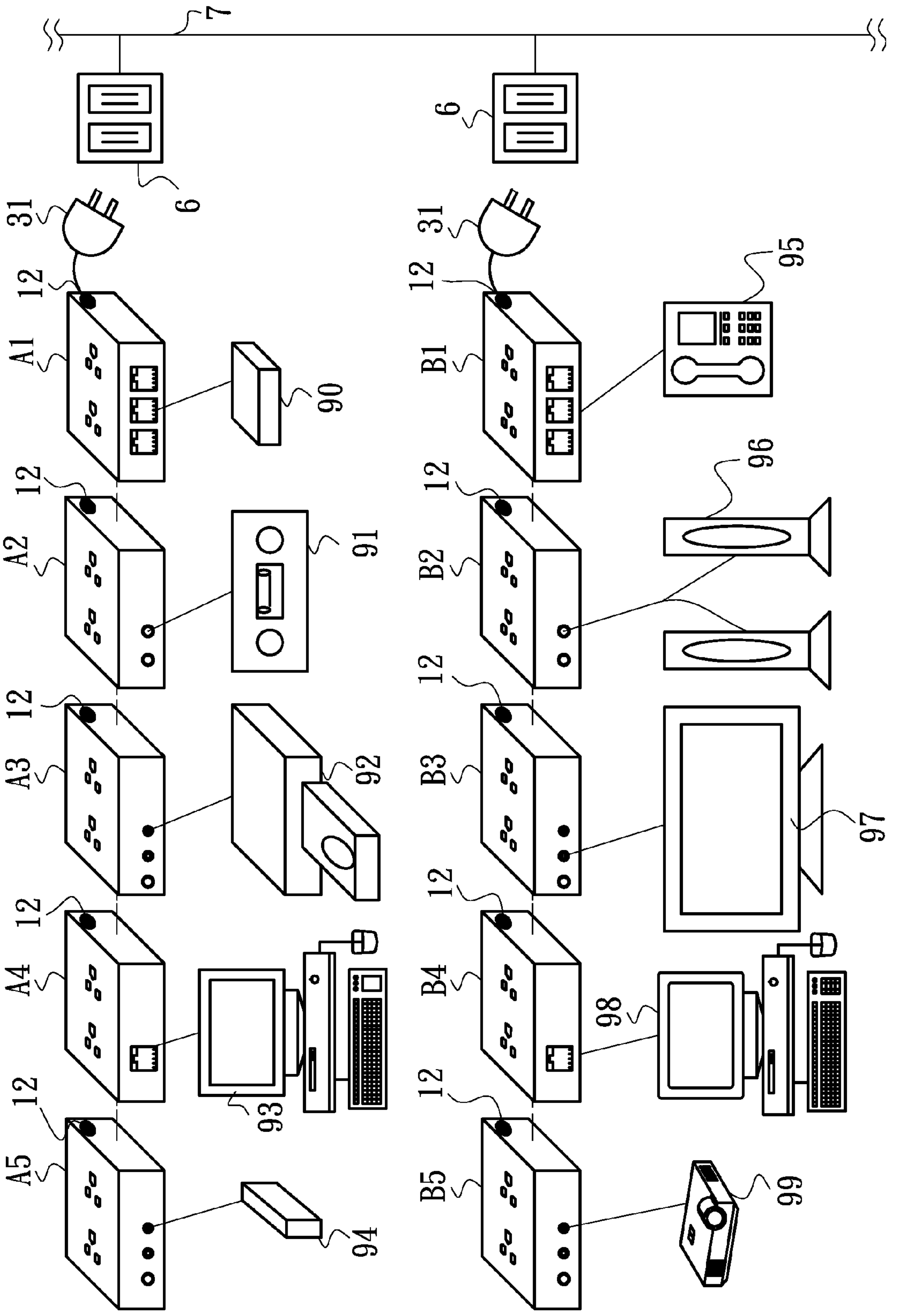
FIG. 2 illustrates a connection view of a combinational power cord for multimedia use.

The invention is characterized in that different transmitting/receiving multimedia power devices can be combined into the combinational power cord via mutual connection of socket 2 and plug, as illustrated in FIG. 2. Different multimedia devices (90-99) are connected to a plurality of multimedia power device (A1~A5, B1~B5). Connected with an ADSL modem, the first multimedia power device (A1) transmits the network data via the plug (31) connected with the wall outlet (6) to the power distribution line (7). Further, a music player can transmit its audio signals via the second multimedia power device (A2) to the power distribution line (7). The first multimedia power device (A1) and the second multimedia power device (A2) are mutually connected by sockets (2), with a few terminals (1) connecting to the power line module (42). The socket (2) of the first multimedia power device (A1) uses connection means to connect with a corresponding socket (2) and terminals (11、12) of the multimedia power device (A2), which in turn connects to the power line module (42). The third, fourth, fifth multimedia power device (A3、A4、A5) are mutually connected in the same way and transmit the signals from the multimedia devices (90~99) to the power line module (42). One end of the plug (31) is connected to the terminal (12) of the first multimedia power device (A1), while the other end of the plug (31) is inserted to the wall outlet (6) to transmit the multimedia signal to the power distribution line (7).

Figure 3:
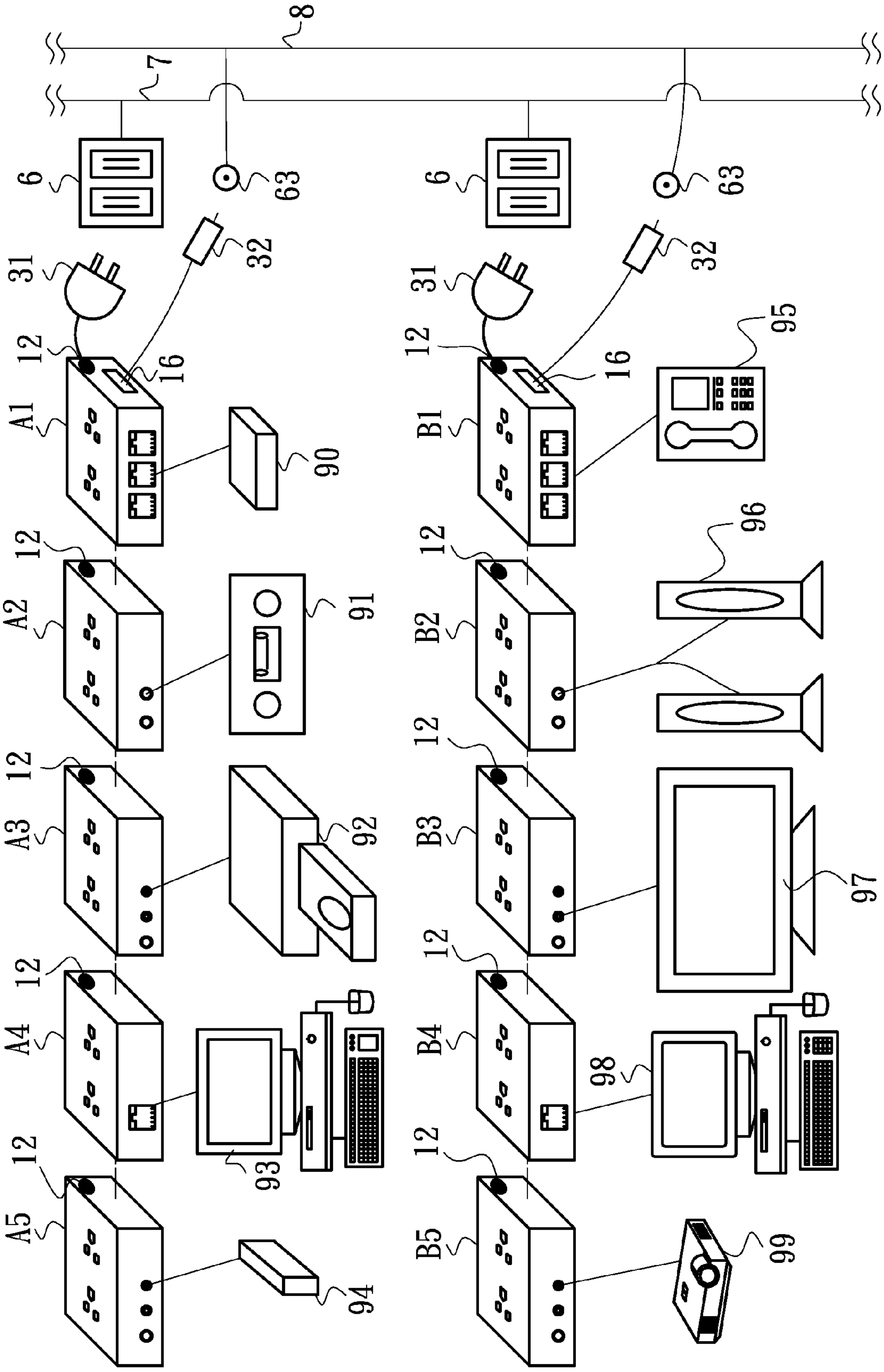
FIG. 3 illustrates a view of a combinational power cord for multimedia use, which is connected by coaxial cables.

The multimedia signals transmitted to the power distribution line (7) can be extracted by the multimedia power devices (B1~B5) on the receiver side. Please refer to FIG. 3 for an embodiment illustrating mutual connection. The network data transmitted by the first multimedia power device (A1) is received through the plug (31) inserted to the wall outlet (6) of the power distribution line (7) on the receiver side, the multimedia power device (B1) separates the network data and sends the data to a network phone through the multimedia network module (43).

Different video signals, audio signals and control signals are fed to the power distribution line (7) via the connection of the terminal (12) of the multimedia power device. The multimedia power device on the receiver side separates the signals and transmit them to respective multimedia devices (90~99). In response to different requirements of the multimedia devices (90~99), both the transmitter side and the receiver side can use the socket (2) to connect in series and so on. One of the multimedia devices (90~99) connected to one of the plurality of multimedia ports (14) exchanges information with another multimedia device, which is also connected to the power distribution line (7) and supports the data communication protocol via the multimedia network module, the power line communication module and the power distribution line. The data communication protocol that the AC power distribution line (7) uses is not limited to certain power line specifications.

Besides, one of the multimedia devices (90~99) connected to one of the plurality of multimedia ports (4) can exchange information via the multimedia network module with another multimedia device (90~99) which is also connected to one of the multimedia ports (4).

Furthermore, one end of the coaxial cable can be connected to the terminal (16) externally added to the multimedia power device, with the terminal (16) connecting to the power line communication module (41), while the other end of the coaxial cable is inserted to the coaxial cable terminal to transmit the multimedia signal to the coaxial cable line. Please refer to FIG. 3 for a coaxial transmission view of the present invention.

Second Embodiment

Figure 4:
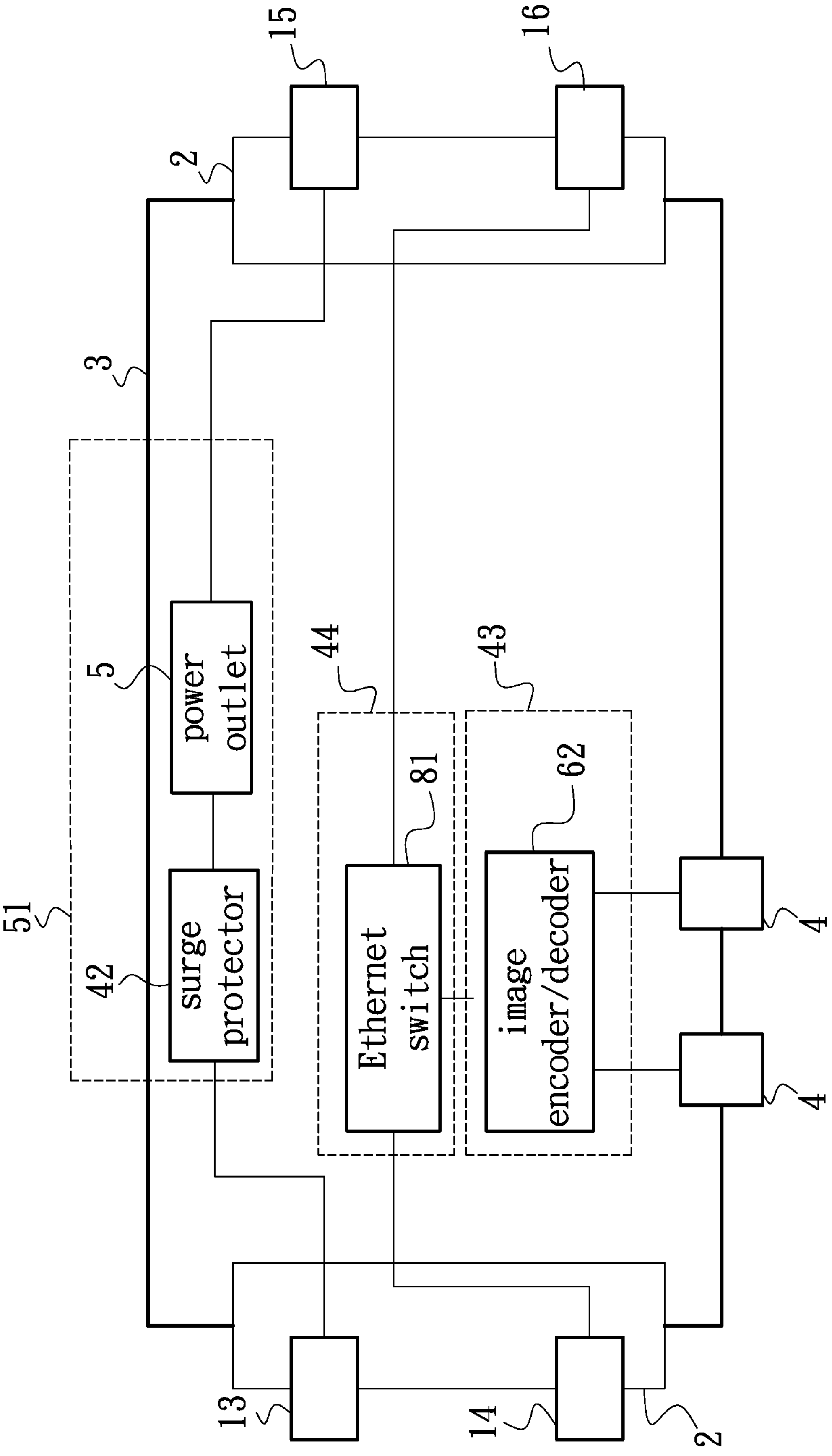
FIG. 4 illustrates a second embodiment view of a combinational power cord for multimedia use.

Please refer to FIG. 4, which illustrates an embodiment view of a combinational power cord for multimedia use. The combinational power cord comprises at least one multimedia power device, wherein the multimedia power device comprises a power line module (42), a case (3), at least one terminals (13~16), at least one socket (2), at least one multimedia port (4), a multimedia network module (43) and a Ethernet module (44). The present invention is characterized in that various multimedia power devices can be mutually connected in series through the socket (2) to become a combinational power cord. Each multimedia power device comprises at least one socket (2) and a few terminals (13~16) connected to the power line module (42) and the Ethernet module (44). The socket (2) uses connection means to connect with a corresponding socket (2) and terminals (1316) of another multimedia power device, which in turn connects to the power line module (42) and the Ethernet module (44).

The case (3) is implemented with a plurality of power outlets (5) and a plurality of multimedia ports (4). The multimedia ports (4) in this embodiment are video/audio connection ports. The power outlet (5) provides power connection to networking devices such as computer or printer, and electrical appliances such as fans or light, in other words, it can act as a traditional power cord. The video/audio connection ports can provide network connection to audio players or multimedia players for network data transmission. The power line module (42) has one end connected to the case (3) and the other end connected to the plug. The plug can be inserted directly into a common power outlet (5) to connect to AC power source. Video/audio data is transmitted to multimedia network module (43) via the video/audio connection port. The multimedia network module (43) comprises an image encoder (62), which encodes the network data into multimedia packets and transmits them to the Ethernet module (44). The Ethernet module (44) is an Ethernet switch (81), which receives the multimedia packets from the multimedia network module (43) and uses the Ethernet data communication protocol to convert and modulate the packets for transmission.

The multimedia power device on the other end receives the Ethernet signals. The Ethernet module (44) receives the Ethernet signals and uses the Ethernet data communication protocol to demodulate and convert the Ethernet signals to packets suitable for the multimedia network module (43), and then sends the packets to the multimedia network module (43) for processing. The multimedia network module (43) can be image decoder (62), which decodes the network data and transmitted the decoded signals to video/audio devices such as TV or multimedia players.

The multimedia network module (43) can be a different module for decoding/encoding different multimedia signals such as HDTV signal, analog/digital video signal, and audio signal.

Figure 5:
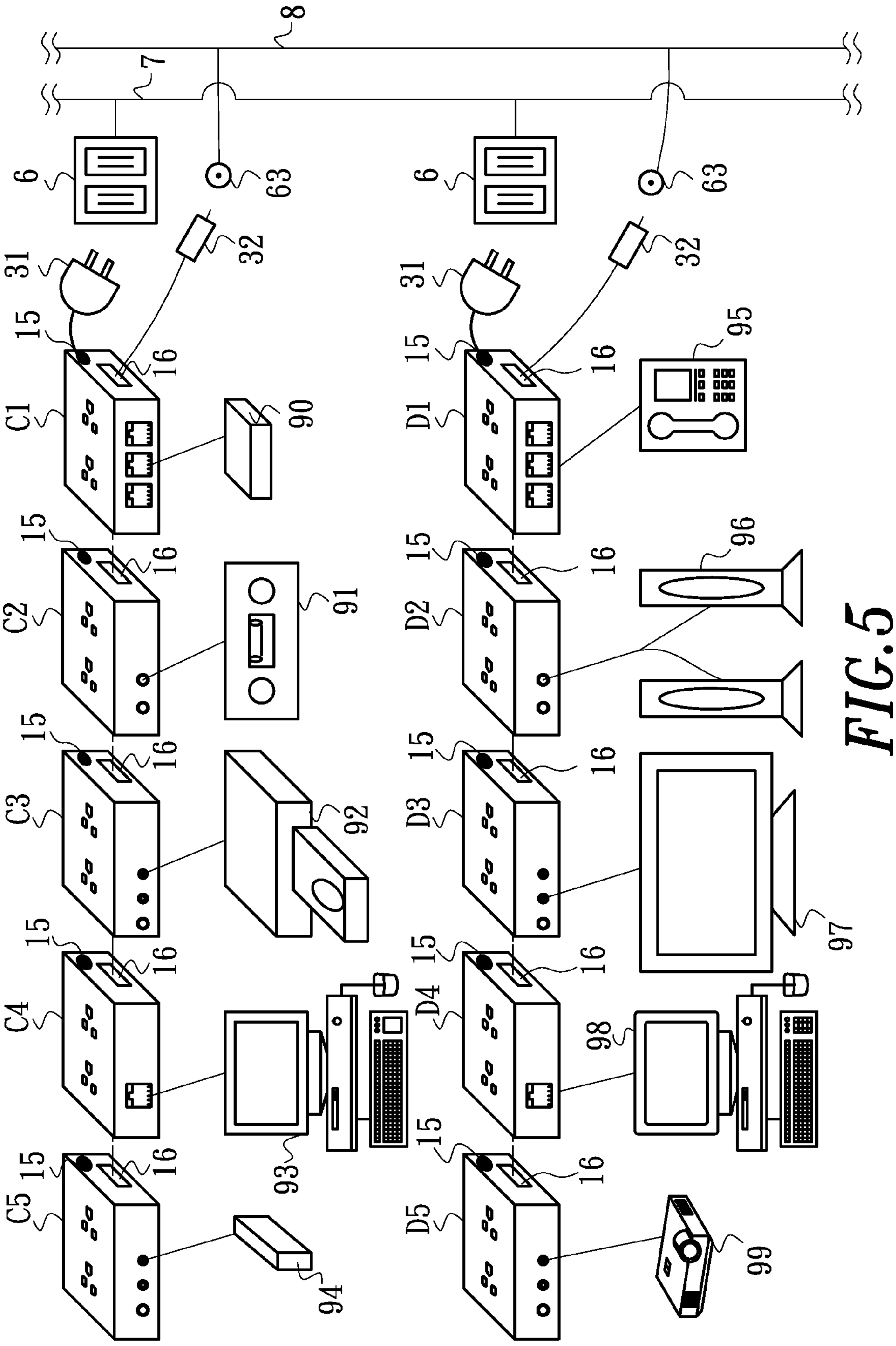
FIG. 5 illustrates a second connection view of a combinational power cord for multimedia use.

Please refer to FIG. 5 for a connection view of a combinational power cord for multimedia use. Different multimedia devices are connected to a plurality of multimedia power device. Connected with an ADSL modem, the first multimedia power device (C1) transmits the network data to the Ethernet module (44). Further, a music player can transmit its audio signals via the second multimedia power device (C2) to the Ethernet network. The first multimedia power device (C1) and the second multimedia power device (C2) are mutually connected by sockets (2). The terminal (15) of the second multimedia power device (C2) is connected to the power line module (42), and the terminal (15) is mutually connected to the terminal (13) of the first multimedia power device (C1). Therefore, the power line modules (42) of the first multimedia power device (C1) and the second multimedia power device (C2) can be mutually connected via the terminals (13, 15).

The terminal (16) of the second multimedia power device (C2) is connected to the Ethernet module (44), and the terminal (16) is mutually connected to the terminal (14) of the first multimedia power device (C1). Therefore, the Ethernet modules (44) of the first multimedia power device (C1) and the second multimedia power device (C2) can be mutually connected via the terminals (14, 16). The third, fourth, fifth multimedia power device (C3, C4, C5) are mutually connected in the same way and transmit the signals from the multimedia devices to the Ethernet module (44).

The multimedia power device can alternatively comprise a power line communication module (41), which loads the network data transmitted by the Ethernet module to the connection of the coaxial cable line (8) and the coaxial cable via the power line communication module (41). The powerline communication module (41) is built-in inside the case (3) and connects to the multimedia network module (43). The powerline communication module (41) receives the multimedia packets from the multimedia network module (43) and uses the powerline baseband to modulate the multimedia packets and the analog front end (AFE) (74) to convert the digital signals into analog signals. Then the transmit filter filters out the noise in the analog signals. Afterwards the line driver (72) loads the analog signals into the coaxial cable for transmission. One end of the coaxial cable can be connected to the terminal (16) of the multimedia power device, while the other end of the coaxial cable is inserted to the coaxial cable terminal (32) to transmit the multimedia signal to the coaxial cable line (8) through the connection of the coaxial cable outlet (63) and the coaxial cable line (8).

Please refer to FIG. 5 for an embodiment illustrating mutual connection. The first multimedia power device (C1) comprises a power line communication module (41), which sends the network data via the connection of the coaxial cable line (8) and the coaxial cable. Please refer to FIG. 4. the power line communication module (41) of the multimedia power device (D1) separates the network data and sends the data to a network phone through the multimedia network module (43).

The multimedia power device on the receiver side separates the signals and transmits them to respective multimedia devices (90~99). In response to different requirements of the multimedia devices (90~99), both the transmitter side and the receiver side can use the socket (2) to connect in series and so on.

Figure 6:
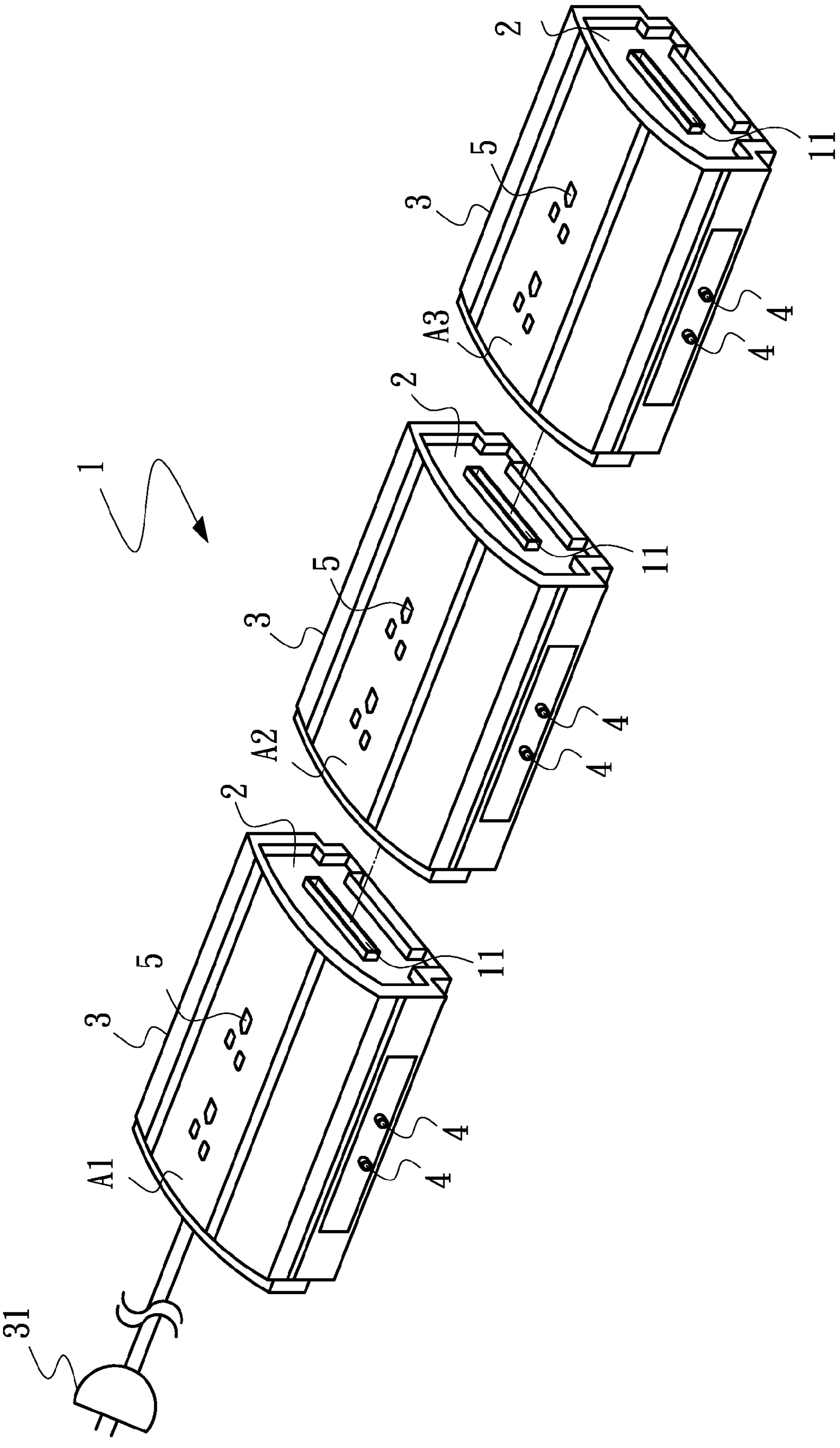
FIG. 6 illustrates a 3D embodiment view of a combinational power cord for multimedia use.
Figure 7:
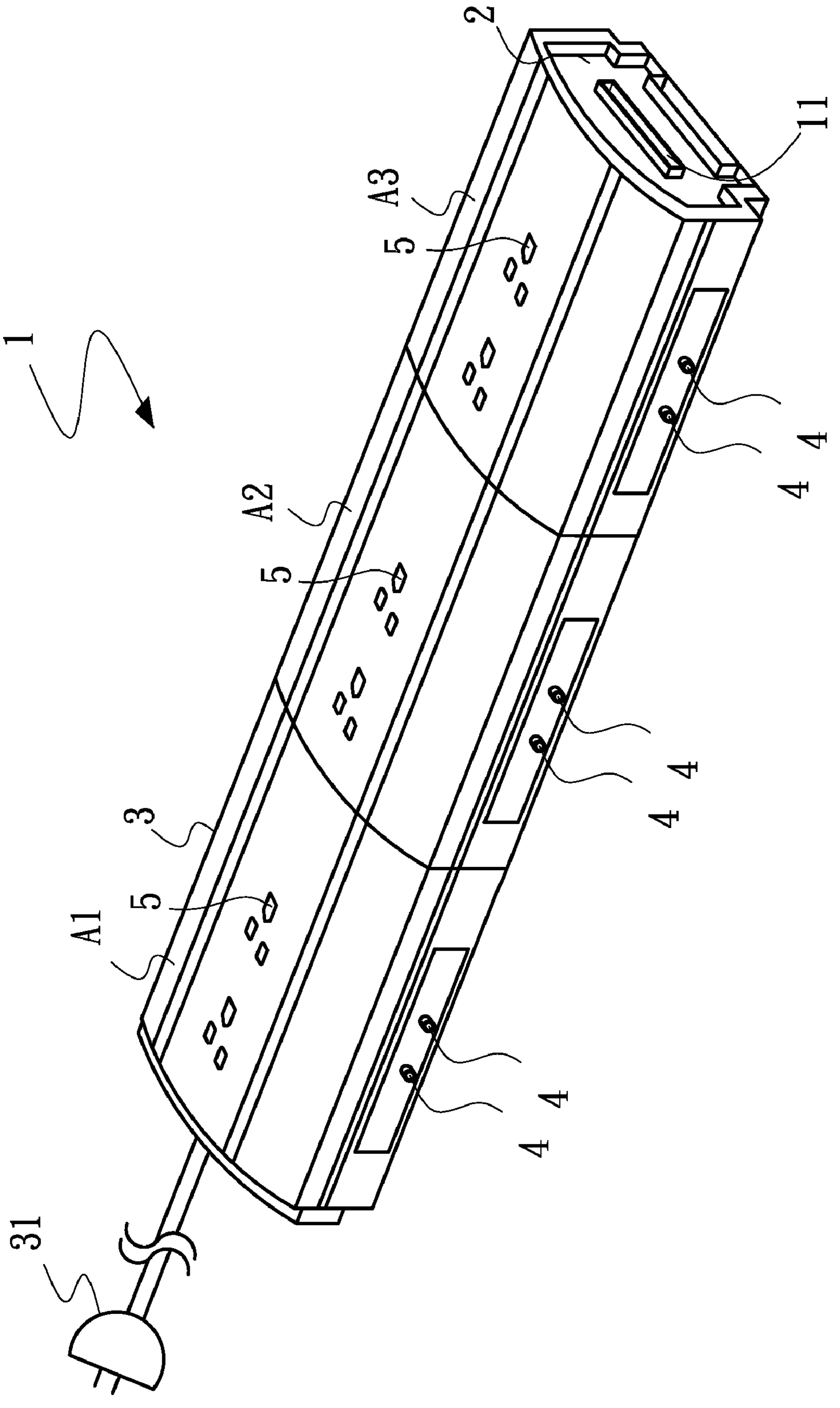
FIG. 7 illustrates a 3D connection view of a combinational power cord for multimedia use.

Please refer to FIG. 6 for the connection configuration of socket (2). Each multimedia power device comprises at least one socket (2) and a few terminals (1) connected to the power line module (42) or the Ethernet module (44). The socket (2) uses connection means to connect different multimedia power devices, as shown in FIG. 7. The first multimedia power device (A1) and the second multimedia power device (A2) are mutually connected by the socket (2), with a few terminal (1) connecting to the power line module (42). The socket (2) of the first multimedia power device (A1) uses connection means to connect with a corresponding socket (2) and terminals (11, 12) of the second multimedia power device (A2), which in turn connects to the power line module (42).

A multimedia device connected to one of the multimedia ports (4) exchanges information with another multimedia device which is connected to the Ethernet network and supports the Ethernet protocol via the multimedia network module, Ethernet module (44) and the Ethernet network.

Besides, a multimedia device connected to one of the multimedia ports (4) can exchange information with another multimedia device connected to another one of the multimedia ports (4) via the multimedia network module.

Many changes and modifications in the above-described embodiment of the invention can be carried out without departing from the scope thereof. Accordingly, to promote the progress in science and the useful arts, the invention is disclosed and is intended to be limited only by the scope of the appended claims.

What is claimed is:

1. A combinational power cord for multimedia use, having at least one multimedia power device, said multimedia power device comprising:

a power line module coupling with one end of a power line to connect with an AC power distribution and to convert an AC power from of said AC power distribution line into suitable driving power for modules depicted below;

a case, having a plurality of power sockets and a plurality of multimedia ports disposed thereon for the AC power from said AC power distribution line to be distributed to said plurality of power sockets;

at least one terminal connected to said power line module;

at least one socket disposed on the outside of said case for connecting with a corresponding socket of another multimedia power device;

at least one multimedia port disposed on the outside of said case for different multimedia devices to couple with said multimedia power device via different multimedia ports;

a multimedia network module which is built-in inside said case for connecting with said plurality of multimedia ports; and a power line communication module which is built-in inside said case for communicating with said power line module and said multimedia network module, said power line communication module using the data communication protocol from of said AC power distribution to convert and modulate multimedia packets sent from said multimedia network module and then sending them over said AC power distribution, in the mean time, said power line communication module using the data communication protocol of said AC power distribution line to convert and demodulate a data transmitted by said AC power distribution into packets suitable for said multimedia network module and then sending packets to said multimedia network module for processing.

2. The combinational power cord for multimedia use as recited in claim 1, wherein a multimedia device connected to one of the multimedia power devices via one of the multimedia ports exchanges information with another multimedia device which is connected to said power line and supports the data communication protocol via said multimedia network module, said power line communication module and said power distribution line.

3. The combinational power cord for multimedia use as recited in claim 2, wherein a multimedia device connected to one of the multimedia power devices via one of the multimedia ports exchanges information with another multimedia device which is connected to said Ethernet network and supports the Ethernet protocol via said multimedia network module, said power line communication module and said Ethernet network.

4. The combinational power cord for multimedia use as recited in claim 2, wherein said Ethernet module of said multimedia power device is an Ethernet hub.

5. The combinational power cord for multimedia use as recited in claim 2, wherein said Ethernet module of said multimedia power device is an Ethernet switch.

6. The combinational power cord for multimedia use as recited in claim 2, wherein said terminal of said multimedia power device is connected to a coaxial cable to transmit multimedia signals to a coaxial line.

7. The combinational power cord for multimedia use as recited in claim 2, wherein network data of said multimedia power device transmitted by said Ethernet module is transmitted by said power line communication module to a coaxial cable connecting to a coaxial line.

8. The combinational power cord for multimedia use as recited in claim 2, wherein a multimedia device connected to one of the multimedia power devices via one of the multimedia ports can exchange information with another multimedia device connected to another one of the multimedia ports via said multimedia network module.

9. The combinational power cord for multimedia use as recited in claim 2, wherein each side of said socket of said multimedia power device comprises a notch, and a pair of retainers is disposed in accordance with said two notches, when multimedia power devices are connected by said socket, said pair of retainers hold said multimedia power devices together.

10. The combinational power cord for multimedia use as recited in claim 2, wherein said multimedia network module of said multimedia power device comprises a control device to control the signal input/output of said multimedia network module.

11. The combinational power cord for multimedia use as recited in claim 2, wherein said power line module of said multimedia power device is equipped with a surge protector to protect said combinational power cord when the voltage rises to an abnormal level.

12. The combinational power cord for multimedia use as recited in claim 1, wherein said terminal of said multimedia power device is connected to said power line to transmit multimedia signals to said power distribution line.

13. The combinational power cord for multimedia use as recited in claim 1, wherein a multimedia device connected to one of the multimedia power devices via one of the multimedia ports can exchange information with another multimedia device connected to another one of the multimedia ports via said multimedia network module.

14. The combinational power cord for multimedia use as recited in claim 1, wherein each side of said socket of said multimedia power device comprises a notch, and a pair of retainers is disposed in accordance with said two notches, when multimedia power devices are connected by said socket, said pair of retainers hold said multimedia power devices together.

15. The combinational power cord for multimedia use as recited in claim 1, wherein said multimedia network module of said multimedia power device comprises a control device to control the signal input/output of said multimedia network module.

16. The combinational power cord for multimedia use as recited in claim 1, wherein said power line module of said multimedia power device is equipped with a surge protector to protect said combinational power cord when the voltage rises to an abnormal level.

17. A combinational power cord for multimedia use, having at least one multimedia power device, said multimedia power device comprising:

power line module coupling with one end of a power line to connect with an AC power distribution and to convert an AC power from of said AC power distribution into suitable driving power for modules depicted below;

a case, having a plurality of power sockets and a plurality of multimedia ports disposed thereon for the AC power from said AC power distribution to be distributed to said plurality of power sockets;

at least one terminal connected to said power line module and an Ethernet module;

at least one socket disposed on the outside of said case for connecting with a corresponding socket of another multimedia power device;

at least one multimedia port disposed on the outside of said case for different multimedia devices to couple with said multimedia power device via different multimedia ports;

a multimedia network module which is built-in inside said case for connecting with said plurality of multimedia ports; and said Ethernet module which is built-in inside said case for communicating with said multimedia network module, said Ethernet module using the Ethernet communication protocol to convert and modulate multimedia packets sent from said multimedia network module and then sending them over an Ethernet network, in the mean time, said Ethernet module using the Ethernet protocol to convert and demodulate a data transmitted by said Ethernet network into packets suitable for said multimedia network module and then sending packets to said multimedia network module for processing.

* * * * *